(No Model.)

F. F. RAYMOND, 2d.
HEEL NAILING MACHINE.

No. 347,063.

4 Sheets—Sheet 1.

Patented Aug. 10, 1886.

WITNESSES.

INVENTOR.

(No Model.)  
F. F. RAYMOND, 2d.  
HEEL NAILING MACHINE.

No. 347,063.  Patented Aug. 10, 1886.

(No Model.)  F. F. RAYMOND, 2d.  4 Sheets—Sheet 3.
HEEL NAILING MACHINE.

No. 347,063. Patented Aug. 10, 1886.

WITNESSES
J. M. Dolan
Fred. B. Dolan

INVENTOR
F. F. Raymond (No Model.)  F. F. RAYMOND, 2d.  4 Sheets—Sheet 4.
HEEL NAILING MACHINE.

No. 347,063.  Patented Aug. 10, 1886.

WITNESSES
J. M. Dolan
Fred B. Dolan

INVENTOR
F. F. Raymond 2d

UNITED STATES PATENT OFFICE.

FREEBORN F. RAYMOND, 2D, OF NEWTON, MASSACHUSETTS.

HEEL-NAILING MACHINE.

SPECIFICATION forming part of Letters Patent No. 347,063, dated August 10, 1886.

Application filed May 28, 1886. Serial No. 203,504. (No model.)

*To all whom it may concern:*

Be it known that I, FREEBORN F. RAYMOND, 2d, of Newton, in the county of Middlesex and State of Massachusetts, a citizen of the United States, have invented a new and useful Improvement in Heel-Nailing Machines, of which the following is a full, clear, and exact description, reference being had to the accompanying drawings, forming a part of this specification, in explaining its nature.

The invention is an improvement upon that described in Letters Patent No. 316,894, dated April 28, 1885, and comprises various details of construction, which are hereinafter referred to.

Figure 1:
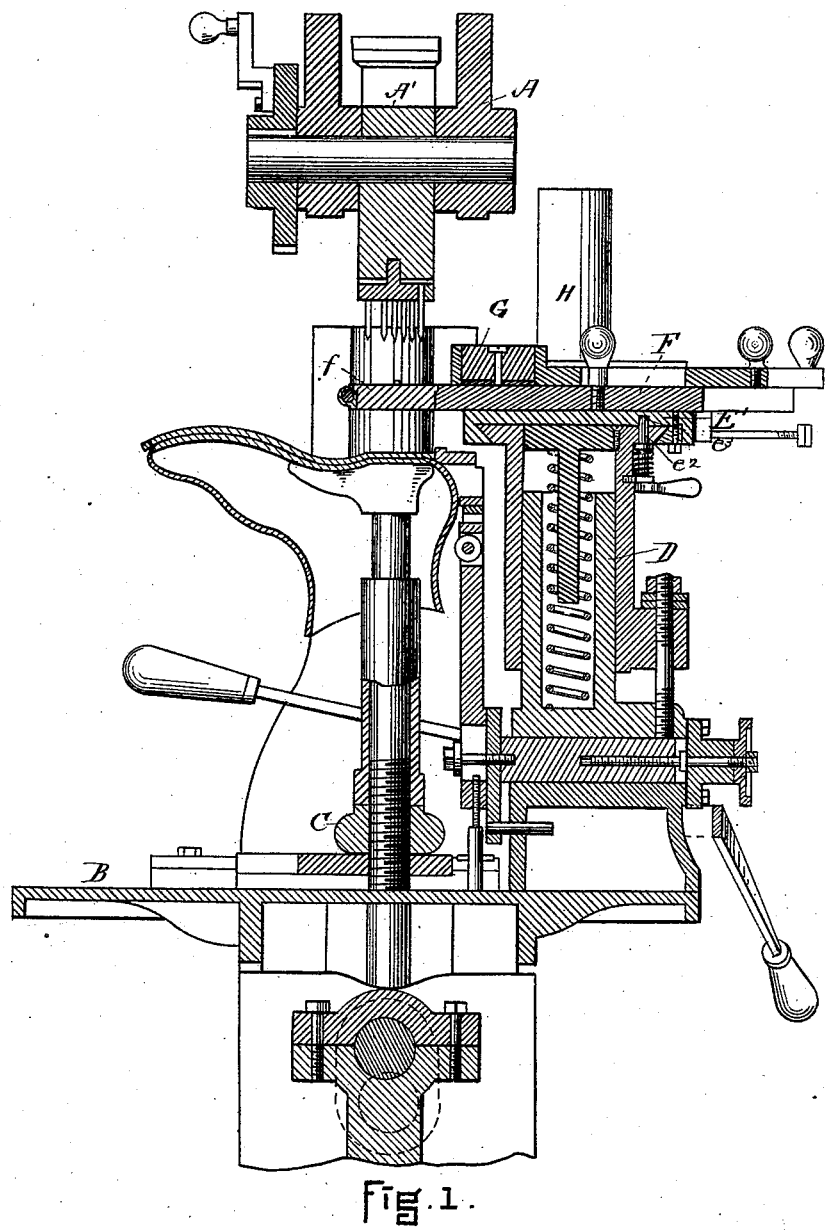
Figure 2:
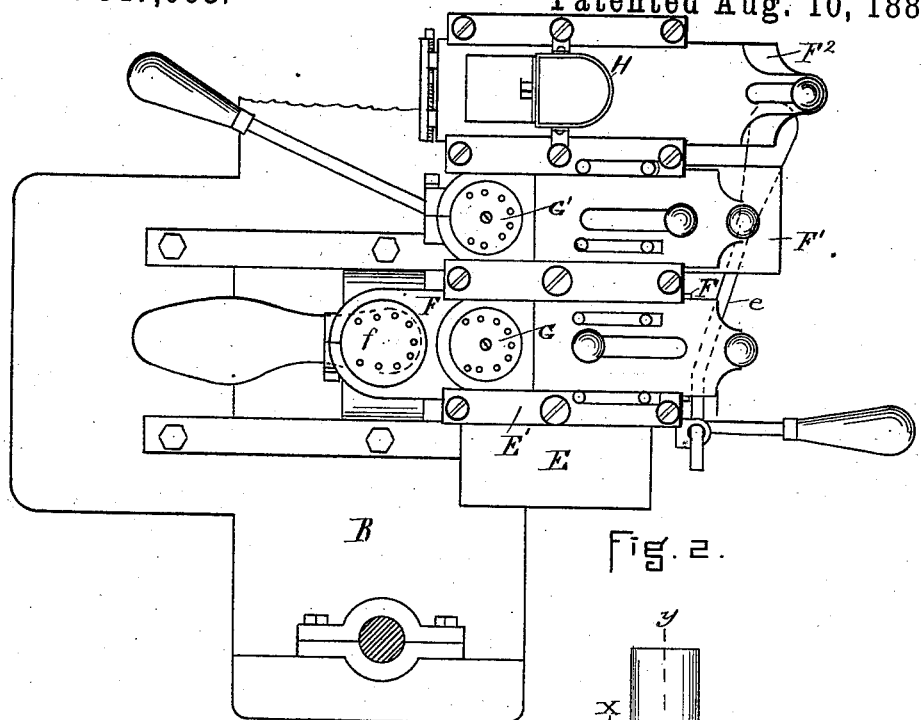
Figure 3:
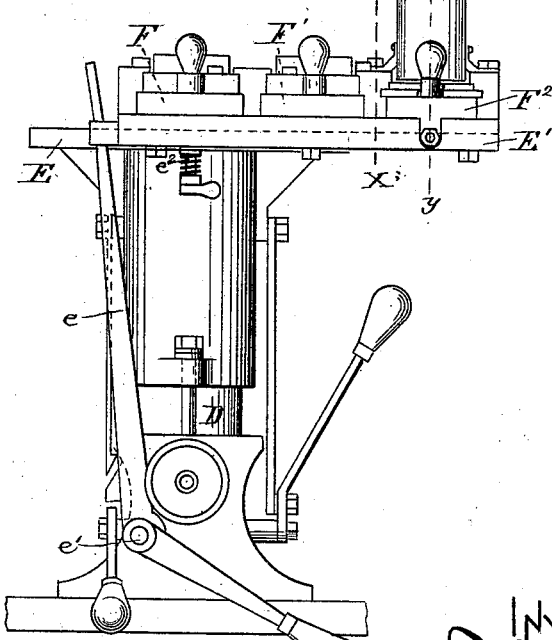
Figure 4:
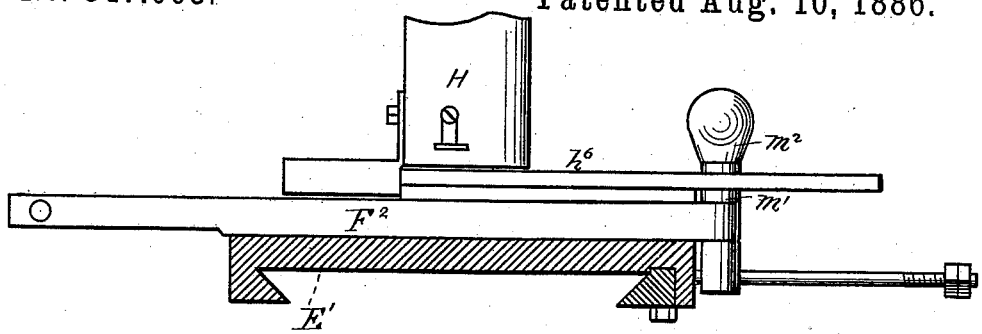
Figure 5:
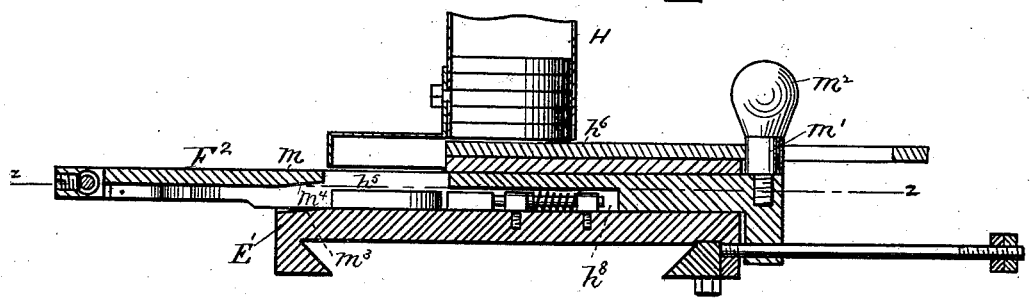
Figure 6:
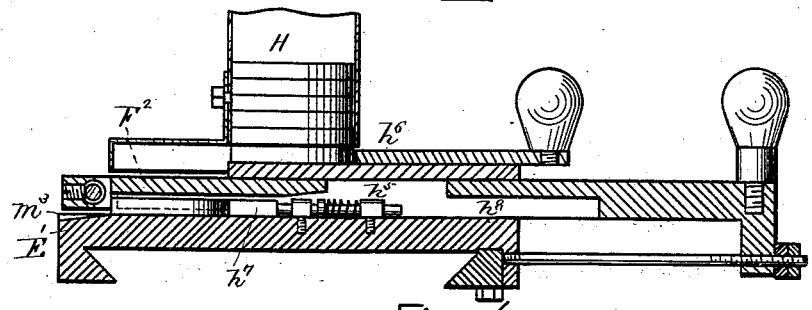
Figure 7:
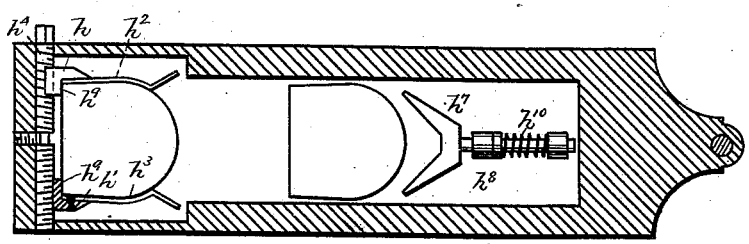
Figure 9:
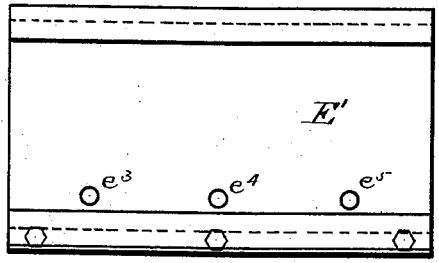
Figure 8:
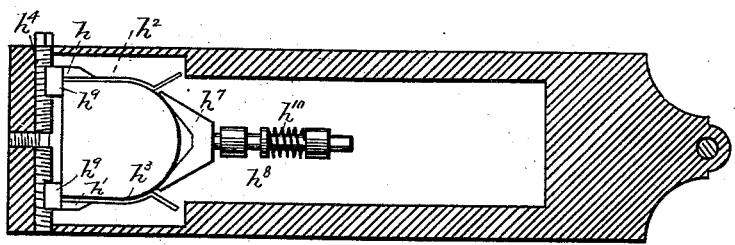

Referring to the drawings, Figure 1 is a view in vertical section of the central and upper parts of a machine having the features of my invention. Fig. 2 is a plan view of a part of the machine above the bed and table. Fig. 3 is a view in rear elevation of the table, movable carriage, and their support. Fig. 4 is a section upon the line $x\ x$ of Fig. 3. Fig. 5 is a section on the line $y\ y$ of Fig. 3. Fig. 6 is a section on the same line as that of Fig. 5, showing substantially the same parts in different positions and differently operated. Fig. 7 is a horizontal section on line $z\ z$ of Fig. 5. Fig. 8 is a view to show the top-lift when seized by the top lift-grasping devices of the carrier-plate. Fig. 9 is a view in plan of the traversing-carriage inverted; and Fig. 10 is a view in plan, showing the templet fixed to the traversing-carriage, instead of arranged to slide thereon.

A is the cross-head of the machine. It is reciprocated in any desired way, and carries a revolving head, A', having arms supporting the awls, drivers, and spanker-block.

B is the bed of the machine; C, the sliding jack or work-support; D, a post adapted to support or carry the table E. This table is arranged to be vertically movable upon the post D, and it carries or supports a laterally-moving carriage, E', which in turn supports or carries a templet-plate, F, having a templet, $f$, a templet-plate, F', having a templet, $f'$, and a top-lift carrier-plate, F².

Figure 10:
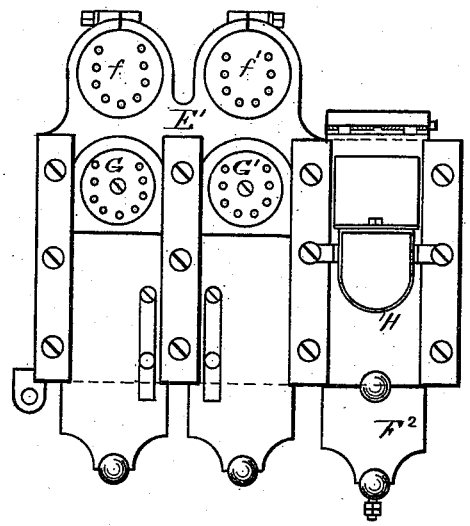

The templet-plates F F' are represented in Fig. 10 as rigidly attached to the transversely-moving carriage E', and in Figs. 1, 2, and 3 as arranged to slide horizontally thereon into and out of operative position. There is arranged over each templet-plate to slide thereon the nail-carrier G, adapted to be used for transferring nails to the templet $f$, and the nail-carrier G', adapted for use in transferring nails to the templet $f'$.

The table E' is movable laterally upon its support or table E by means of a lever, $e$, pivoted at $e'$, and connecting its upper end with the carriage E', or in any other desired way. A spring-latch, $e^2$, is arranged to engage the holes $e^3\ e^4\ e^5$ successively and lock the carriage E' automatically into operative position to bring the templets $f\ f'$ and the top-lift carrier-plate either into operative position over the work or into a position from which they can be moved upon the carriage E' directly into operative position.

Two templets are used when it is desirable to nail both the outsole of the boot or shoe and to attach the heel thereto, or to drive two lines of nails into a heel. The top-lift plate is supplied with top-lifts from a box, H. This box is supported by the carriage E', and is movable laterally therewith.

The top-lift plate has upon its under surface the angle-blocks $h\ h'$, which carry the top-lift grasping-springs $h^2\ h^3$, and are adjustable in relation to each other by a screw, $h^4$. This form of top-lift holder is shown and claimed in Patent No. 316,894, dated April 28, 1885. The top-lift carrier-plate also has a hole or aperture, $h^5$, through which top-lifts are successively fed from the box H by means of the plate $h^6$, which is moved to eject the under top-lift of the stack into the hole or aperture $h^5$ of the top-lift carrier-plate F².

There is attached to the plate E' a V-shaped yielding stop, $h^7$. This stop is within the extension $h^8$ of the opening or aperture $h^5$ of the top-lift sliding plate when the top-lift plate is moved out to feed a top-lift, and its office is to hold a top-lift after it has been ejected from the box H into the pocket $h^5$, and while the top-lift carrying plate is being moved backward, and while the spring-arms $h^2$ and $h^3$ of the top-lift holder are engaging the top-lift thus held and until the top-lift carrier-plate has been moved backward sufficiently to bring the gage-surfaces $h^9$ of the top-lift holder in contact with the breast or front surface of the top-lift; and in Fig. 7 I represent the position the spring-arms of the top-lift holder, the top-lift, and the stop $h^7$ bear to each other at the beginning of the backward movement of the top-lift carrier-plate, and in Fig. 8 I represent the position these parts bear to each other at the completion of such movement.

The stop $h^7$ is held by a stiff spring, $h^{10}$, so that while it will yield somewhat it will hold the top-lift blank against the pressure of the spring-grasping arms $h^2$ $h^3$, and until it is accurately fitted or located against the gage-surfaces of the top-lift holder. The top-lift carrier-plate has an extension, $m$, on its under surface, which is arranged to close over the top-lift holder in the pocket before the spring-arms $h^2$ $h^3$ come in contact therewith, and so as to prevent it being lifted from the surface on which it rests. The top-lift ejecting-plate $h^6$ and the top-lift carrier-plate $F^2$ are connected with each other by a stud, $m'$, or any other suitable connection, and are both moved by the knob or handle $m^2$; and upon one forward movement of two plates a top-lift is fed forward by the top-lift carrier to a position over the heel-blank, and at the same time a top-lift is ejected by the plate $h^6$ from the stack of top-lifts into the pocket $h^5$ and in a position to be grasped by the top-lift holding or grasping device upon the backward movement of both plates. The same mechanism can be used of course with slight modification for feeding the heel-blanks.

It will be necessary to use only one templet when one gang of nails only is driven into the heel.

I prefer that the surface $m^3$ of the table be very slightly inclined, so that the top-lift may not drag thereon as it is being moved from the pocket outward to a position for attachment to the heel; also that the lower surface, $m^4$, of the part $m$ of the top-lift carrier-plate be inclined so as not to come in contact with the breast of a top-lift held by the stop $h^7$ on its backward movement.

When the top-lift ejecting-plate $h^6$ and the top-lift carrier-plate are employed together and connected by a stud or other device, so that the movement of one plate causes the movement of the other, it will be desirable when the top-lift carrier-plate is given a greater movement than the top-lift ejecting-plate to provide the top-lift ejecting-plate with a slot, in which the stud $m'$ may move so as to permit the top-lift carrier-plate to be moved farther than the top-lift-ejecting plate. It is not necessary, however, that these plates be coupled or connecected together, and in Fig. 6 I have shown them disconnected. When this construction is employed, it will be preferable to move the top-lift ejecting-plate $h^6$ first, and to eject a top-lift from the box H upon the upper surface of the top-lift carrier-plate, which is drawn back, and upon the forward movement of the top-lift carrier-plate the top-lift falls from its upper surface through the hole $h^5$ and upon the surface of the carriage $E'$, in front of the stop $h^7$. This brings the top-lift into position to be seized or grasped by the top-lift grasping-arms $h^2$ $h^3$ of the top-lift carrier-plate, and the top-lift carrier-plate is then moved back to take the top-lift. This method of operating the two plates is necessary for providing the top-lift carrier-plate with the first top-lift; and in subsequently operating the two plates the top-lift ejecting-plate $h^6$ is first moved to eject the top-lift upon the surface of the top-lift carrier-plate, as represented in Fig. 6, and the top-lift carrier-plate then moved forward with the top-lift which has previously been fed into position to be grasped by its holding devices, while the second top-lift falls into position to be received by it on its second backward movement.

When two templets are used, the revolving head preferably will be provided with five arms, upon which will be mounted a group of awls and a group of drivers for use with one templet, and a second group of awls and a second group of drivers for use with the other templet, and a spanking-arm for moving the top-lift carrier-plate downward in spanking the top-lift carrier on the heel.

In operation, the boot or shoe is placed upon the last or work-support and moved into position between the shoe-centering devices, attached either to the jack or to the post. The centering devices are not shown or described herein; and I prefer to use devices similar to those shown and described in the said Patent No. 316,894. The first templet, $f$, if arranged to slide upon the carriage $E'$, is moved into proper position, (but if it is arranged not to slide thereon is in proper position,) and the group of awls to be used therewith is reciprocated, the nail-loader G moved to feed nails previously placed therein, and the drivers brought into position and reciprocated. The carriage $E'$ is then moved to bring the second templet, $f'$, into operative position. The heel-blank is placed upon the sole of the shoe and the awls and drivers reciprocated, and nails fed as before. The carriage $E'$ is then moved to bring the top-lift carrier-plate into position, and the top-lift is automatically fed from the box H to a position over the heel, and is spanked on by the reciprocation of the spanking-arm of the reciprocating head. The carriage is moved downward and locked upon the downward movement of each templet, and is released after each group of nails has been driven. The boot or shoe and its last or work-support are held stationary by the shoe-centering guides while the transverse movement of the carriage is taking place.

Of course, the two templets can be used for driving two groups of nails into a heel-blank or outsole, instead of one group into an outsole and one group into a heel-blank.

Having thus fully described my invention, I claim and desire to secure by Letters Patent of the United States—

1. The combination, in a heel-nailing machine, of the nailing devices, a jack or support for the boot or shoe, a carriage, E', carrying the templets $f f'$, supported by a table, and means, substantially as specified, which adapt the carriage to be moved on the table laterally at right angles to the length of the templets, substantially as described.

2. The combination, in a heel-nailing machine, of a last or work-support, the nailing devices, a table, a carriage, E', supported by the table, a sliding templet carried by the carriage, and means, substantially as specified, which adapt the carriage to be moved on the table laterally at right angles to the length of the templet, substantially as described.

3. The combination, in a heel-nailing machine, of the last or work-support, the nailing devices, a table, a carriage, E', supported by the table and carrying one templet, $f$, and means, substantially as specified, which adapt the carriage to be moved on the table laterally at right angles to the length of the templet, substantially as described.

4. The combination, in a heel-nailing machine, of a last or work-support, the nailing devices, a table, a carriage, E', supported thereby, a top-lift carrier-plate supported by said carriage, and means, substantially as specified, which adapt the carriage to be moved on the table laterally at right angles to the length of the last, substantially as described.

5. The combination, in a heel-nailing machine, of a last or work-support, heel-attaching devices, a table, a carriage, E', a templet, a top-lift carrier-plate supported by said carriage, and means, substantially as specified, which adapt the carriage to be moved on the table laterally at right angles to the length of the templet, substantially as described.

6. The combination, in a heel-nailing machine, of a top-lift carrier-plate having a hole or aperture, $h^5$, a stop, $h^7$, the table E', and top-lift grasping devices carried by said plate, substantially as described.

7. The combination of a top-lift plate having a hole or aperture, $h^5$, a section, $m'$, having an inclined surface, $m^4$, the stop $h^7$, and top-lift-grasping devices, substantially as described.

8. The combination, in a heel-nailing machine, of a top-lift carrier-plate having top-lift-grasping devices adapted to automatically grasp a top-lift on its backward movement, and provided with a hole or aperture, $h^5$, and devices for holding a top-lift in a pocket and presenting it to the top-lift-grasping devices during said backward movement of the top-lift carrier-plate, substantially as described.

9. The combination of the sliding top-lift plate having a hole, $h^5$, and top-lift-grasping devices with the stop $h^7$, and a box for holding top-lifts in stack, and an ejector for moving the top-lifts therefrom in succession through the hole or aperture $h^5$ to a position in front of the stop, substantially as described.

10. The combination of a box for holding the top-lifts in stack, a sliding ejector-plate for feeding the top-lifts therefrom into a pocket or position to be grasped by the top-lift grasping or holding devices of the top-lift carrier-plate, said top-lift grasping or holding devices and said top-lift carrier-plate connected with the top-lift ejector-plate, whereby one movement of the carrier-plate moves a top-lift into position for attachment and a second top-lift into a position to be grasped or seized by the top-lift-holding devices, substantially as described.

11. The combination of the table E' and devices for moving it laterally in its support E, substantially as described.

12. In a heel-nailing machine, a heel-lift carrier-plate having heel-lift grasping or holding devices upon its under surface, and a hole or passage, $h^5$, in said plate, through which heel-lifts are fed or presented to said heel-lift grasping or holding devices, substantially as specified.

FREEBORN F. RAYMOND, 2D.

Witnesses:
J. M. DOLAN,
FRED. B. DOLAN.